Figure 1:
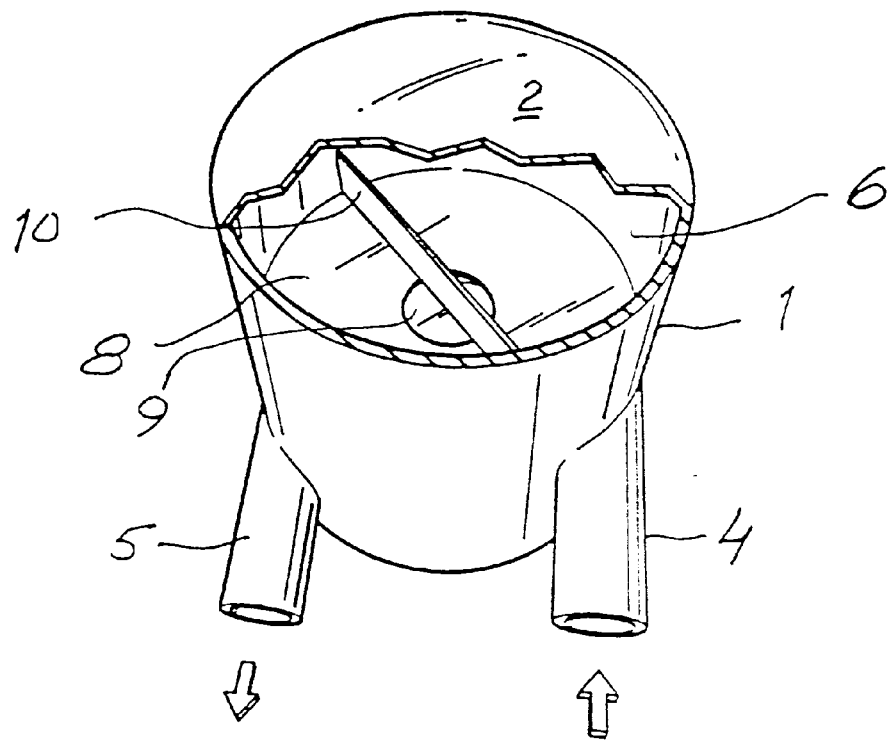

United States Patent [19]
Frödin et al.

[11] Patent Number: 5,918,760
[45] Date of Patent: Jul. 6, 1999

[54] HYDRAULIC FLUID RESERVOIR

[75] Inventors: Sten Frödin, Järfälla; Thomas Dahl, Spånga, both of Sweden

[73] Assignee: Vickers Incorporated, Maumee, Ohio

[21] Appl. No.: 08/931,308

[22] Filed: Sep. 16, 1997

[30] Foreign Application Priority Data

Sep. 20, 1996 [SE] Sweden .................................. 9603440

[51] Int. Cl.⁶ ................................................... E03B 11/00
[52] U.S. Cl. ............................ 220/661; 220/562; 60/592; 137/574
[58] Field of Search ..................................... 220/661, 562, 220/563, 4.12, 4.13; 60/592; 137/574, 576

[56] References Cited

U.S. PATENT DOCUMENTS

| | | | |
|---|---|---|---|
| 4,170,877 | 10/1979 | Pickering | 220/563 X |
| 4,315,531 | 2/1982 | Gerhard | 220/562 X |
| 4,424,829 | 1/1984 | Millington et al. | 137/574 X |
| 4,431,027 | 2/1984 | Sabina, Jr. | 137/574 |
| 4,805,668 | 2/1989 | Genter et al. | 60/592 X |
| 5,356,535 | 10/1994 | Ueno et al. | 137/574 X |

*Primary Examiner*—Steven Pollard
*Attorney, Agent, or Firm*—Pillsbury Madison & Sutro LLP

[57] ABSTRACT

The invention relates to a hydraulic fluid reservoir comprising a substantially cylindrical wall (1), an upper wall (2) and a lower wall, and two tubular connection pieces (4, 5) for entering and discharging hydraulic fluid into and out from the interior of the reservoir. The two tubular connection pieces, an inlet connection piece (4) and an outlet connection piece (5) are substantially tangentially connected to the cylindrical wall (1) to preserve the momentum of a fluid fed into the reservoir.

7 Claims, 1 Drawing Sheet

HYDRAULIC FLUID RESERVOIR

The present invention relates to a hydraulic fluid reservoir, especially to a hydraulic fluid reservoir for use in vehicles.

In hydraulic structures where the hydraulic fluid is circulated by means of pumps, it is often necessary to provide means for deaeration of the hydraulic fluid. In stationary structures the deaeration can be effected by using a big hydraulic tank in which the deaeration can take place.

When using hydraulic fluid for driving assisting units, such as power steering pumps, air-conditioning units, for operating the motor cooling fan, and the like, in a vehicle, it is not practical to use a big hydraulic tank for deaeration of the hydraulic fluid, due to the excessive weight that has to be transported by the vehicle.

Another problem occurring in hydraulic systems, especially at low temperatures, is that it might be difficult to feed the hydraulic fluid from the reservoir to the pump with sufficient speed and amount to satisfy the user units.

The object of the present invention is therefore to provide a new hydraulic fluid reservoir, especially for use in vehicles, solving both problems stated above.

The object of the invention has been realized with a hydraulic reservoir having the characteristic features set forth in the following claims.

Figure 2:
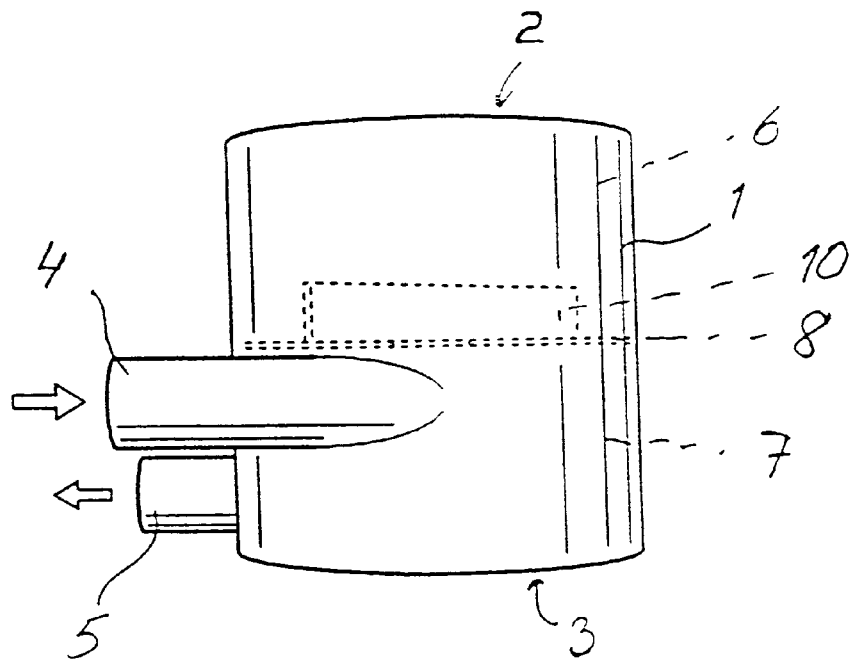

The invention will now be explained in more detail with reference to a non-limiting exemplifying embodiment thereof illustrated in the accompanying drawings, in which FIG. 1 is a perspective view of a hydraulic reservoir, partly broken away, according to the invention, and FIG. 2 is a section view of the reservoir shown in FIG. 1.

A hydraulic reservoir according to the invention comprises a substantially cylindrical wall 1, upper wall 2 and lower wall 3. The walls are preferably made of sheet metal, but can also be made of other materials such as, e.g. plastics. To the lower part of the cylindrical wall 1 two tubular connection pieces 4, 5 are substantially tangentially connected to the cylindrical wall and forming passages into and out from the reservoir. The connection pieces 4, 5 are connected to hydraulic fluid lines (not shown) leading to and from, respectively, a hydraulic pump (not shown).

The hydraulic reservoir is divided into an upper chamber 6 and a lower chamber 7 which chambers are separated from each other by means of an annular disc 8 having a central opening 9 for communication between the upper and lower chambers 6 and 7. The annular disc 8 is located at about half the height of the cylindrical reservoir, depending on system design, thus dividing the reservoir into the two chambers 6, 7. The inlet connection piece 4 is located near the annular disc 8, but in the lower chamber 7, whereas the outlet connection piece 5 also in the lower chamber 7 is located close to the bottom of the reservoir.

In the upper chamber 6 is directly above the annular disc located a means of preventing fluid rotation, e.g. a wall member 10, extending diametrically across the disc 8 and extending axially at least a part of the distance towards the upper wall 2. The wall member 10 then crosses the central opening 9 in the annular disc 8.

In use the fluid coming from the hydraulic fluid pump via the user unit, is introduced into the hydraulic fluid reservoir via the inlet connection piece 4, at a relatively high speed, tangentially into the lower chamber 7. When the fluid enters the reservoir, a rotational movement of the fluid is created in the lower chamber 7, and the fluid that leave the reservoir through the outlet connection piece 5 is given a momentum assisting in filling the hydraulic pump. At the same time air included in the hydraulic fluid, due to the centripetal force, is forced towards the centre of the chamber and there released from the fluid up through the central opening 9 in the annular disc 8, and allowed to leave through a hole in the upper wall 2. If the amount of fluid returned to the reservoir through the inlet connection piece 4 is great enough, or the amount of fluid in the reservoir is great enough, the fluid level will raise through the central opening 9 in the annular disc 8 into the upper chamber 6. Due to the wall member 10 extending diametrically over the lower part of the upper chamber 6, the fluid there is prevented from rotating, whereas substantially all the fluid in the lower chamber 7 is rotated due to the return flow through the tangentially orientated inlet connection piece 4. The amount of fluid in the reservoir may raise, e.g. when a user unit is shut off, and the hydraulic pump no longer draws any fluid through the outlet connection piece 5.

With a hydraulic fluid reservoir according to the invention, a volume of the reservoir of only 2–3 liters may be sufficient for use in a bus, thus substantially reducing the weight of the reservoir with its content.

An additional advantage with the hydraulic reservoir according to the invention is its feeding of the hydraulic pump, due to the momentum of the fluid preserved from the inlet into the reservoir.

A hydraulic reservoir according to the invention can of course not only be used in a vehicle, but also in other constructions where the amount of fluid circulated in the hydraulic system shall be reduced, or where there is no space for accommodating a voluminous hydraulic tank.

We claim:

1. A hydraulic reservoir comprising a substantially cylindrical wall (1), an upper wall (2) and a lower wall (3), and two tubular connection pieces (4, 5) for entering and discharging hydraulic fluid into and out from the interior of the reservoir, characterised in that the tubular connection pieces (4, 5), an inlet connection piece (4) and an outlet connection piece (5), are substantially tangentially connected to the cylindrical wall (1).

2. A hydraulic reservoir according to claim 1, characterised in that the interior of the reservoir is divided into an upper chamber (6) and a lower chamber (7) by means of an annular disc (8), having a central opening (9) for communication between the upper and lower chambers (6; 7).

3. A hydraulic reservoir according to claim 2, characterised in that in the upper chamber (6) a means of preventing fluid rotation (10) is arranged to prevent the fluid from rotation in the upper chamber (6).

4. A hydraulic reservoir according to claim 3, characterised in that the means of preventing fluid rotation is a wall member (10) arranged close to the annular disc (8), and extending diametrically across the disc (8) and its central opening (9).

5. A hydraulic reservoir according to claim 4, characterised in that the wall member (10) in axial direction only extends a part of the distance to the upper wall (2).

6. A hydraulic reservoir according to any of the preceding claims, characterised in that the inlet connection piece (4) is located at a higher level along the cylindrical wall (1) than the outlet connection piece (5).

7. A hydraulic reservoir according to claim 2, characterised in that both connection pieces are located in the lower chamber (7), and the inlet connection piece (4) is located close to the annular disc (8) whereas the outlet connection piece (S) is located near the bottom wall (3).

* * * * *